United States Patent [19]

Fuller, Jr.

[11] Patent Number: 4,924,998
[45] Date of Patent: May 15, 1990

[54] STORAGE MECHANISM FOR SORTED ARTICLES

[75] Inventor: Robert L. Fuller, Jr., Issaquah, Wash.

[73] Assignee: The Boeing Company, Seattle, Wash.

[21] Appl. No.: 269,991

[22] Filed: Nov. 10, 1988

[51] Int. Cl.$^5$ ............................................. B65G 47/46
[52] U.S. Cl. ..................................... 198/365; 198/706; 198/778
[58] Field of Search ............ 198/365, 706, 778, 477.1

[56] References Cited

U.S. PATENT DOCUMENTS

| | | | |
|---|---|---|---|
| 3,360,097 | 12/1967 | Hoffman et al. | 198/778 |
| 3,550,751 | 12/1970 | Jack | 198/365 |
| 3,750,879 | 8/1973 | Luckett et al. | 198/365 |
| 4,450,953 | 5/1984 | Cann et al. | 198/778 |
| 4,688,678 | 8/1987 | Zue et al. | 198/365 |
| 4,741,430 | 5/1988 | Roinestad | 198/778 |

Primary Examiner—Joseph E. Valenza
Attorney, Agent, or Firm—Delbert J. Barnard

[57] ABSTRACT

A frame is positioned about a vertical axis (z). A helical track composed of track sections (72) is supported on the frame and extends about the vertical axis (z). The helical track has a lower entrance end and an upper exit end. An endless conveyor (EC) comprising a series of article carriers (26) moves along an endless path, defined in part by the helical track. A plurality of article receiving receptacles (20) are supported by the frame, radially outwardly from the helical track. A helical ramp is located radially between the helical track and the plurality of article receiving receptacles. A support frame for the receptacles, the helical ramp and the helical track are all of sectional construction and each section is positioned between an adjacent pair of radially extending frame portions. A rotating drive drum is supported for rotation about the vertical axis. The helical track surrounds the drive drum. The drum is driven in steps, equal to the angular spacing of the receptacles. The drum engages the endless conveyor and moves it in steps. The article carriers are spaced apart a distance equal to a step length. Each article carrier is pivotable in position between a carry position and a discharge position. When the carrier is pivoted into its discharger position, the article which it carries falls by gravity onto the ramp and is guided by the ramp into a dedicated receptacle for that particular article.

58 Claims, 10 Drawing Sheets

STORAGE MECHANISM FOR SORTED ARTICLES

TECHNICAL FIELD

This invention relates to automated handling and storage of a large number of relatively small articles (e.g. drill bits). More particularly, it relates to a mechanism for collecting and storing within a small area of floor space, large numbers of many types of articles.

BACKGROUND OF THE INVENTION

Many manufacturing operations (e.g. the manufacture of aircraft) require the drilling of a large number of holes in varying sizes. Drill bits are used until they become dull and then they are resharpened. In a typical aircraft manufacturing plant, it is necessary to resharpen an extremely large number of drill bits each week. By way of example, approximately fifty thousand drill bits are resharpened each week by The Boeing Company in a facility in Auburn, Wash.

The used drill bits are cleaned and sorted before being resharpened. In the past, the sorting operation has been a manual process requiring a number of people (e.g. eight) to perform rough sorting and final sorting activities. In the manual process, cleaned drill bits are deposited onto a conveyor which moves past two or three people who manually remove the drill bits from the conveyor and separate them into rough sort catagories (e.g. twenty to twenty-five catagories). The drill bits are then hand carried to final sort areas where additional personnel (e.g. five to six people) manually identify and place the drill bits into species bins. In the aforementioned Auburn facility of the Boeing Company, the drill bits to be sorted comprise over six hundred types or species.

A principal object of the present invention is to provide a mechanised delivery of articles, such as drill bits, to species bins, and an arrangement of the species bins which places a quite large number of species bins within a small amount of floor space.

RELATED APPLICATIONS

The apparatus of the present invention may be a part of an automated article sorting system which receives the articles in bulk, sometimes entangled, and automatically separates them and starts them on a path of travel, in single file. By way of example, the articles can be separated and moved onto a conveyor, in single file, by use of a singulating system which forms the subject matter of a co-pending companion application Ser. No. 07/240,130, filed Nov. 10, 1988, and entitled "Article Singulating System and Method".

For some articles, a uniform end-to-end orientation of the article on the conveyor is important. By way of example, it is advantageous that drill bits to be sorted be moved through the sorting system with a common end (e.g. the shank end) leading. In such case, it is necessary to correct the end-to-end orientation of the singulated articles which are not properly oriented when they are placed on the conveyor. Such orientation may be accomplished by use of an orientation system which forms the subject matter of a second co-pending companion application Ser. No. 07/270,251, filed Nov. 10, 1988, and entitled "Article Orientation System And Method."

Following orientation, the articles to be sorted may be moved past an article identification device, (e.g. an optical micrometer), which identifies the articles as to type or species and produces an identification signal that is used for automatically placing the articles into receiving bins or receptacles. This sorting can be accomplished by use of a method and system of a type forming the subject matter of a third co-pending application Ser. No. 07/270,221, filed Nov. 10, 1988, and entitled "Article Sorting Apparatus And Method."

An overall system for handling and sorting drill bits forms the subject matter of a fourth co-pending application Ser. No. 07/270,129, filed Nov. 10, 1988, and entitled "Automated Drill Sorting System and Method."

DISCLOSURE OF THE INVENTION

The article storage mechanism of the invention is basically characterized by a frame that is positioned about a vertical axis. A helical track is supported on the frame. The helical track extends about a vertical axis and has a lower entrance end and an upper exit end. The helical track is a portion of an endless path of travel for an endless conveyor. A plurality of article receiving receptacles are supported on and by the frame, in a position radially outwardly from the helical track. The receptacles are positioned to receive articles carried to them by the article carriers of the endless conveyor.

According to an aspect of the invention, the frame comprises a plurality of circumferentially spaced apart frame portions. Each frame portion may include a support column structure at its outer end, and support members projecting radially inwardly from the support column structure towards the axis. The helical track is supported on the support members. In preferred form, a ramp structure is positioned radially between the helical path and the receptacles. Also in preferred form, the ramp structure is helical in shape and the receptacles are arranged in a helical pattern, immediately outwardly of the ramp. The ramp slopes downwardly as it extends outwardly from the helical track to the receptacles, and serves to guide articles from the article carriers into the receptacles.

In preferred form the helical track the ramp and support beams which support the receptacles are made in sections sized to extend between the adjacent frame portions. At their ends the sections are detachably connected to the frame portions. This allows an initial easy assembly of the mechanism and an easy disassembly of the mechanism for maintenance and repair purposes.

According to an aspect of the invention, a step drive is provided for the endless conveyor, for moving the endless conveyor in steps. Each step moves each article carrier from a position of radial alignment with one of the article receiving receptacles into a position of radial alignment with the next article receiving receptacle along the endless path.

In preferred form, the mechanism includes an elongated drum extending vertically of the frame, and supported for rotation about the vertical axis, inwardly of the helical track. A rotary intermittent drive is provided for the drum, connected to step the drum in position. A drive-transferring connection is provided between the drum and the endless conveyor, with each step of the drum moving each article conveyor a step, from adjacent one article receiving receptacle to adjacent the next article receiving receptacle.

In preferred form, the endless path of travel for the endless conveyor also includes an article loading station, a path section extending from the exit end of the helical track to the article loading station, a path section extending from the article loading station to the entrance end of the helical track, and a wheel adjacent the article loading station about which the endless conveyor extends. There is a positive drive transferring connection between the wheel and the endless conveyor. There is also a positive drive transmission interconnection between the drum and the wheel, so that each step movement of the drum is transmitted to the wheel, to cause a corresponding step movement of the wheel. This coordinates the loading and unloading sections of the system, so that a predetermined number of steps of movement will exist between the article loading station and each of the article receiving receptacles.

According to an aspect of the invention, each article carrier includes a base, a carrier tube having a closed end pivotally attached to the base, and an open opposite end. A tube support is mounted on the base for movement between a support position and a release position. When the tube support is in its support position, it supports the carrier tube with its open end directed upwardly a sufficient amount that an article in the tube will not fall out by gravity. When the tube support is in its release position, the carrier tube is allowed to pivot downwardly an amount sufficient to allow an article within the carrier tube to move by gravity out from the carrier tube. A separate operator is associated with each article receiving receptacle, of a type which can be energized on command to move the support member from its support position to its release position. In preferred form, the operator is an electric solenoid which is mounted on lower portions of the helical track, in a position to be radially inwardly adjacent the path of travel of the tube supports on the article carriers. Each solenoid includes an extendible portion which, when the solenoid is energized, extends radially against any tube support in its path, to move the tube support from its support position into its release position. In response, the tube swings downwardly and deposits the article which it carries into the receptacle with which it is aligned at the time.

Further objects, features and advantages of the invention are hereinafter described in detail as a part of the description of the best mode.

BRIEF DESCRIPTION OF THE DRAWINGS

Like reference numerals or letters are used to designate like parts throughout the several views of the drawing, and.

BEST MODE FOR CARRYING OUT THE INVENTION

The storage mechanism of the invention will be described in conjunction with a particular system for identifying articles to be sorted and for loading the articles onto the endless conveyor that is a part of the mechanism. However, it is to be understood that the storage mechanism of the invention may have utility with other types of systems for identifying the articles, and may have more general utility.

Figure 1:
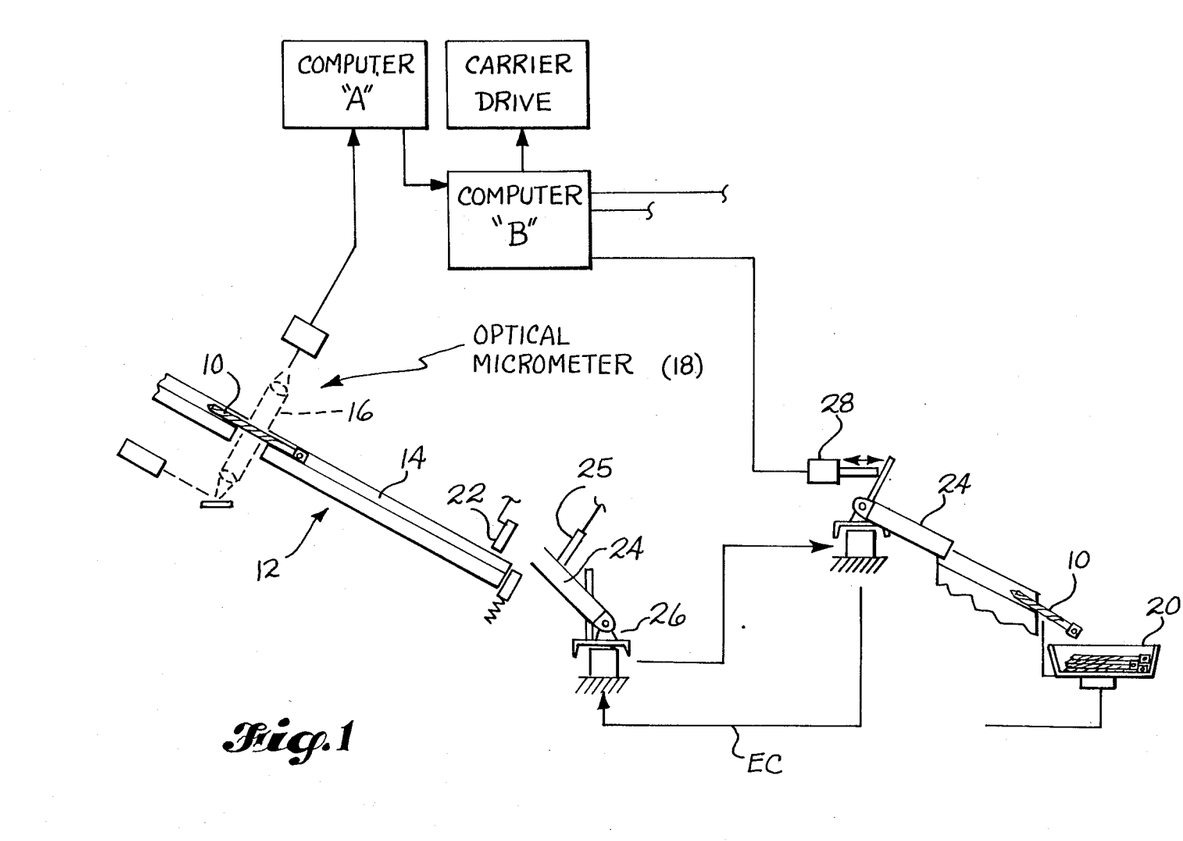
FIG. 1 is a simplified schematic diagram of an article sorting system, showing the position in such system of the sorted article collection and storage mechanism of the present invention.

Referring to FIG. 1, articles 10 to be sorted are delivered single file, proper end first (if end-to-end orientation makes a difference), onto the upper end of a gravity conveyor 12. The conveyor 12 includes a slideway which may include a channel 14 for guiding the articles 10 as they descend by gravity along the conveyor 12. The channel 14 may be in the form of a groove cut into a length of self-lubricating plastic material, used to facilitate sliding movement of the articles 10 along the slideway. In FIG. 1, an article 10 is shown in the process of sliding through a scanner beam 16 which is generated by an optical micrometer 18. As described in detail in the aforementioned copending application Ser. No. 07/270,221, entitled "Article Sorting Apparatus And Method", the optical micrometer 18 utilizes the pattern of interruption of the scanner beam 16 to identify the article 10 and produce an identification signal. This signal is fed to a computer "B" which uses it in conjunction with stored information, for placing the identified article 10 into a proper storage receptacle 20.

Figure 2:
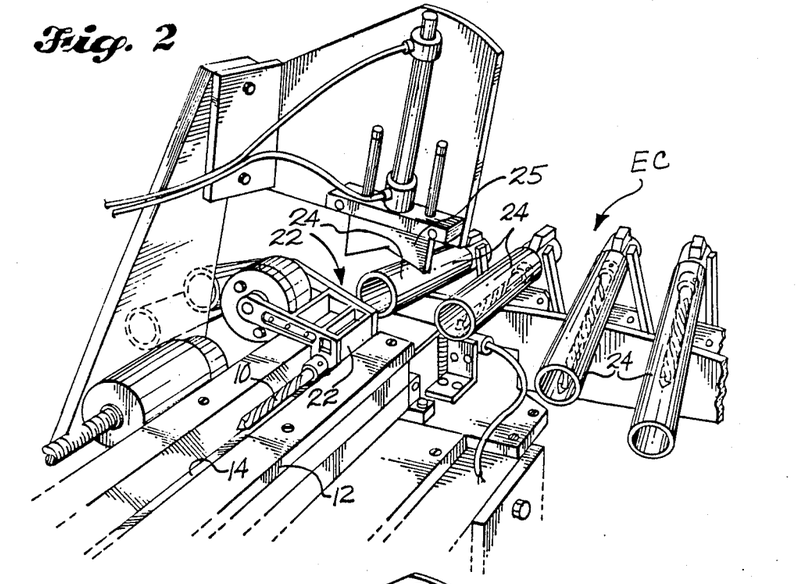
FIG. 2 is a fragmentary isometric view looking toward the lower end of a slide conveyor and an article loading station for an endless conveyor, such view showing a load gate in a down position and a drill bit against the load gate, and showing a carrier tube at the article loading station in an up position.
Figure 3:
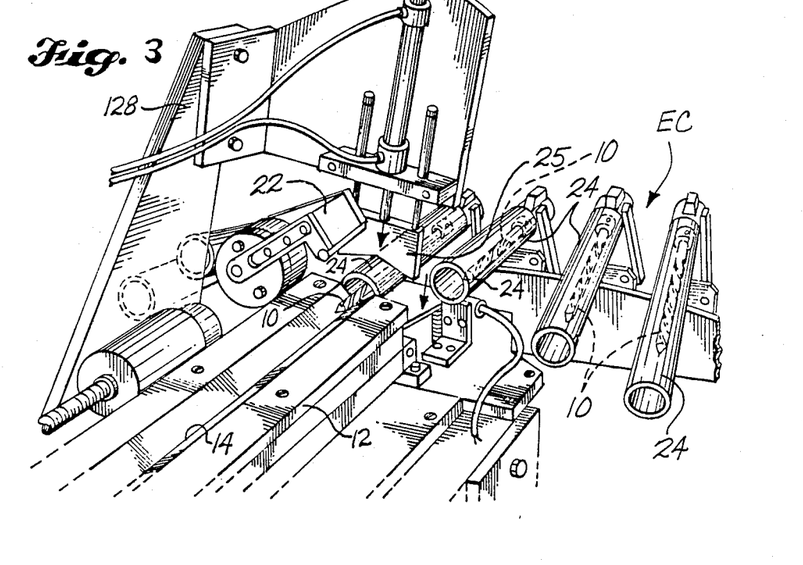
FIG. 3 is a view like FIG. 2, but showing the load gate retracted, the carrier tube at the article loading station depressed into a position placing its open end in axial alignment with the slideway of the gravity conveyor, and showing the drill bit in the process of sliding into the carrier tube.

After a given article 10 is moved through the scanner beam 16, it is allowed to slide on down the slideway 14 into a position against a "load" gate 22, shown in an "up" position in FIGS. 1 and 3, and in a "down" position in FIG. 2. The article 10 stays in position against the load gate 22 until a carrier tube portion 24 of a carrier unit 26 is moved into an article receiving position in alignment with the slideway 14 (FIG. 3), such as by extension of a push down element 25. Then, load gate 22 is retracted to allow the article 10 to slide into the tube 24 (FIG. 3). After loading, element 25 is retracted, allowing the tube 24 to move upwardly free of the conveyor 12, so that it can be moved forwardly.

Carrier unit 26 is one of a series of like article carrier units 26 which are a part of an endless conveyor EC. The carrier units 26 are connected together and are movable in succession along an endless path. Each carrier unit 26, starting from the article loading station at the lower end of the gravity conveyor 12, is moved by the endless conveyor EC along a path bordering a series of article receiving stations 20. Each article receiving station 20 is associated with a particular species of article amongst the articles to be sorted. As will hereinafter be described in detail, the endless conveyor EC moves the carrier units 26 along the path in steps of a length equal to the spacing of the article receiving stations 20.

Each carrier unit 26 leaves the article loading station with the open end of its tube 24 directed upwardly at least an amount sufficient to prevent the article 10 from falling out from the tube 24. Each carrier unit 26 remains in this orientation until it has been moved by the endless conveyor EC into a position adjacent the particular receiving station for the particular species of article 10 that is in the tube 24. The identification signal generated by the optical micrometer 18, together with any other identification signals which might have been made, is fed to a computer "B". Computer "B" uses the identification signal to determine how many steps that each carrier unit 26 must move in order for it to be positioned adjacent the particular receiving station 20 that is associated with the particular species of article 10 that is within its tube 24. When the carrier unit 26 reaches the position adjacent the related receiving station 20, computer "B" sends a control signal to a release operator 28 (hereinafter described) at the receiving station. This operator 28 functions to cause the tube 24 to tip into a position allowing the article 10 to fall out from it by gravity into a collection receptacle 20 at the receiving station.

The particular system for which the mechanism of the invention was developed had to handle and sort a large total number of articles, comprising a large number of different species of the articles 10. Accordingly, it was necessary to provide a large number of receiving stations for the articles. As will be described, this has conveniently been done by positioning the receiving receptacles 20 to one side of a helical path and then arranging the endless conveyor EC so as to travel the helical path. This arrangement provides a good utilization of available space. It thus becomes possible to position a large number of receiving receptacles within a small area of floor space.

Figure 6:
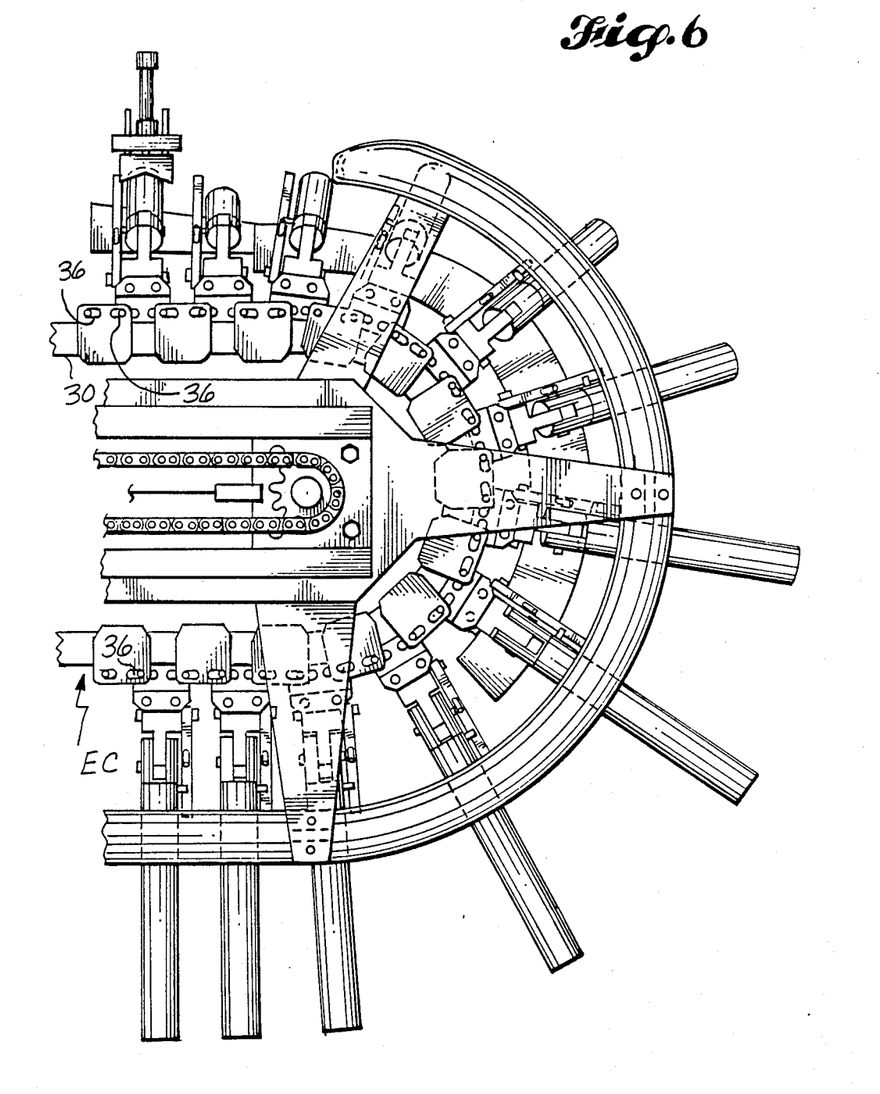
FIG. 6 is a fragmentary side view of an end portion of the endless conveyor, looking towards the side thereof opposite the side shown by FIGS. 2 and 3.
Figures 8, 9:
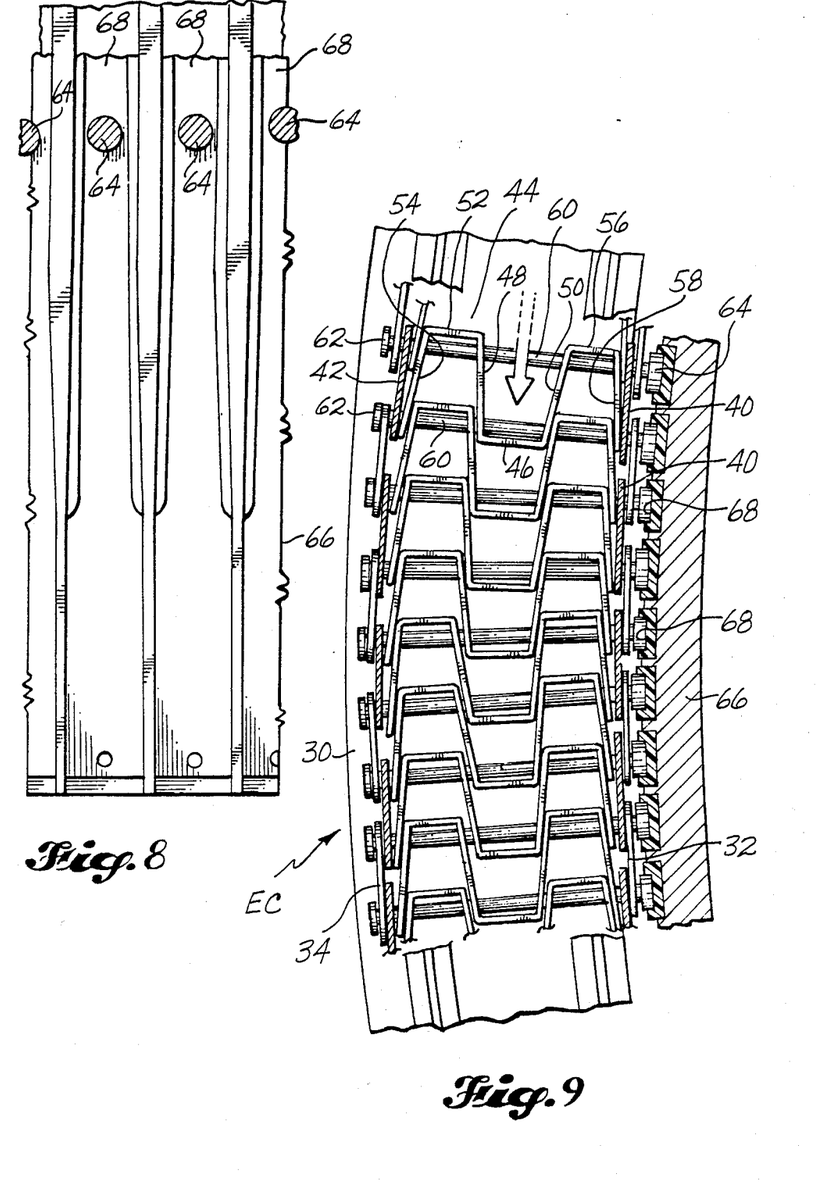
FIG. 8 is a fragmentary elevational view of a drive drum portion of the endless conveyor.
FIG. 9 is a fragmentary top plan view of a carrier chain portion of the endless conveyor, showing a drive engagement between the drive drum and the carrier chain.
Figure 13:
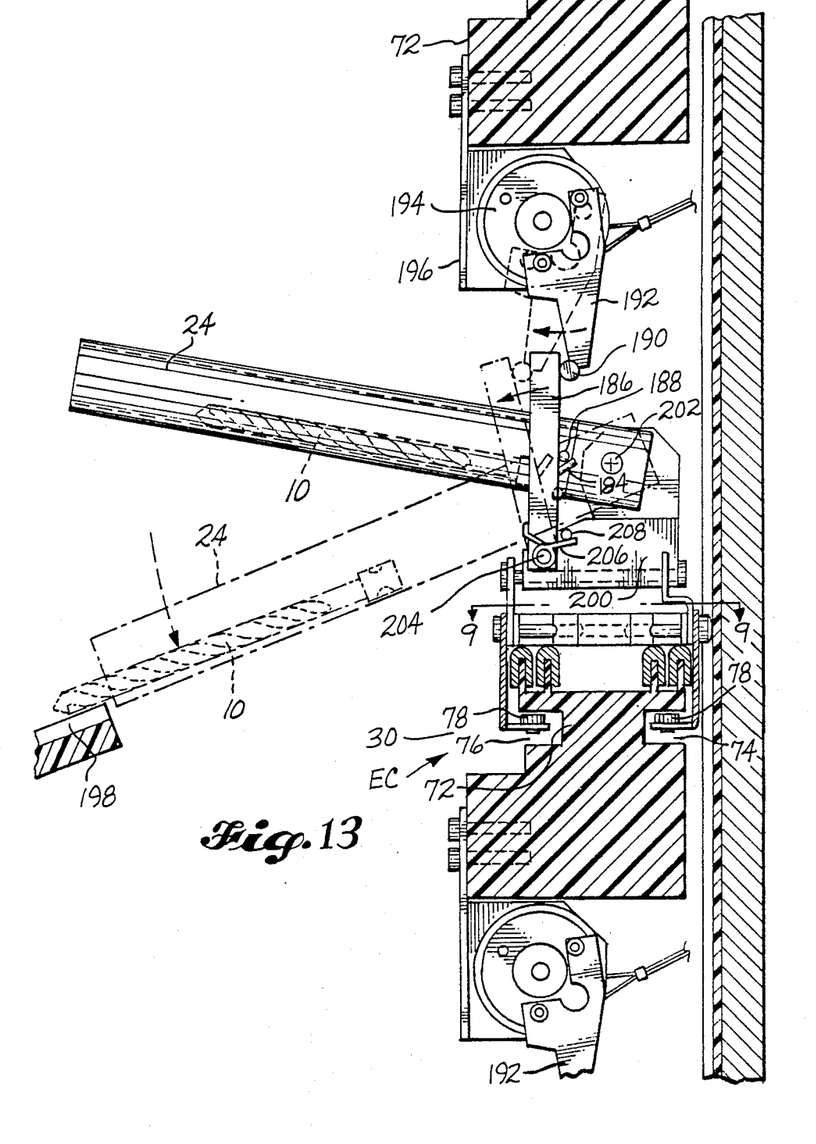
FIG. 13 is a fragmentary view of a carrier unit, including a solid line showing of the carrier tube in its carry position and a broken line showing of the carrier tube in its discharge position.

As shown by FIGS. 6, 9, 11 and 13, the endless conveyor EC is composed of a chain-like, endless flexible component, hereinafter referred to as a "chain", and designated 30 (FIGS. 6, 9 and 13). As shown by FIG. 9, the chain 30 comprises a series of pairs of side plates, typical ones of which are designated 32 and 34 in the drawing. The upper portions of the side plates 32, 34 include slots 36 (FIG. 6) which are aligned with each other in the direction of conveyor movement (FIG. 6). The carrier units 26 include base frames 38 which are each positioned laterally of the conveyor path, between links 40, 42 which have slotted lower portions. A plurality of bent thin metal segments 44 are disposed laterally between the links 40, 42. Each segment 44 comprises a U-shaped central portion defined by an end member 46 and side members 48, 50. Side member 48 is connected to an end member 52 and end member 52 is connected to a side member 54. In similar fashion, side member 50 is connected to an end member 56 and end member 56 is connected to a side member 58. End member 52 and side members 48, 54 form a U-shaped portion which is directed opposite to, and is positioned on one side of the U-shaped portion 46, 48, 50. End member 56 and side members 50, 58 form another U-shaped portion on the opposite side of U-shaped portion 46, 48, 50, which is also oppositely directed. The side members 48, 50, 54, 58 all include slots which are elongated in the direction of travel of the conveyor. Connector pins 60 extend through the slots in the side members 48, 50, 54, 58 and also through the slots in the side plates 32, 34, and through the slots in the links 40, 42. A first head 62 is provided at a first end of each pin 60. A second head 64 is provided at the opposite end of each pin 60. As best shown by FIG. 9, the U-shaped portions of the links 44 nest in each other and in their nested position they form a chain-like structure which is braced laterally of the path of travel while at the same time allowing up and down bending movement of the chain and also allowing the chain to travel around a curved path. The slots allow the plates 34 and the links 42 which are on the outside of the curve to move relatively apart and at the same time the slots on the inside of the curve allow the plates 32 and the links 40 to move relatively closely together. The slots in the segments 44 allow relative movement between the connector pins 60 and all of the slotted parts. This construction of a flexible conveyor element is not per se a part of the invention. Flexible conveyor elements of this general construction are known in the art, but for other uses. For example, see U.S. Pat. No. 4,078,655, granted Mar. 14, 1978, to Gerald C. Roinestat.

In the illustrated embodiment, a vertically elongated drum 66 is provided, and such drum 66 is supported for rotation about a vertical axis Z. As best shown by FIGS. 8 and 9, the drum 66 is constructed to provide a plurality of vertically disposed channels 68 into which the pin heads 64 are received. The drive mechanism (FIGS. 4 and 7) at the lower end of the drum 66 rotates the drum 66 in steps, each of which is substantially equal to the spacing of the carrier tubes 44 and the center-to-center spacing of the article receiving receptacles 20.

Figure 4:
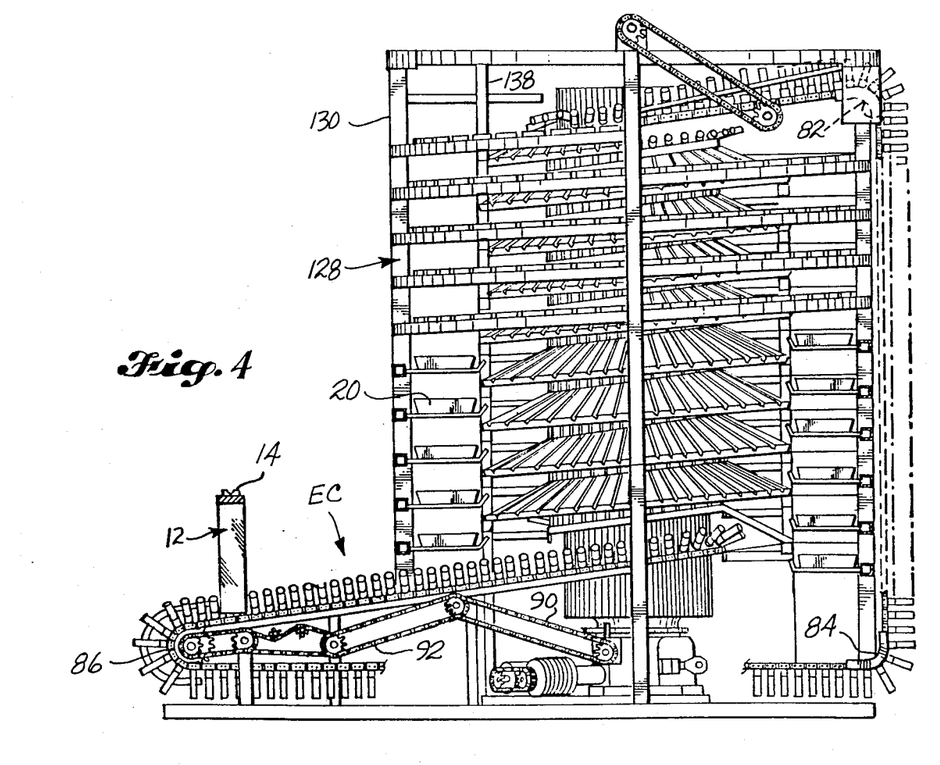
FIG. 4 is an elevational view of the sorted article receiving portion of the system, with foreground portions of the mechanism omitted for clarity of illustration of other portions which otherwise would be hidden from view.

Referring to FIG. 4, an upper run of the conveyor EC extends from the load station, at the lower end of slide conveyor 12, along a relatively straight path which slopes upwardly at an angle equal to the pitch of the helical path of travel of the endless conveyor EC. The pin heads 64 approach the lower portion of the drum 66 along a tangent and then mesh with the channels 68, in the manner that gear teeth mesh with each other. Accordingly, the rotating drum becomes the drive member for the endless chain of the endless conveyor EC. The step-by-step rotation of the drum 66 is transmitted by the walls of the channels 68 to the pin heads 64, and from the pin heads 64 to the endless conveyor chain. Preferably, the channels 68 are constructed from a self-lubricated plastic material for the purpose of cutting down on friction between them and the pin heads 64.

Figures 11, 12:
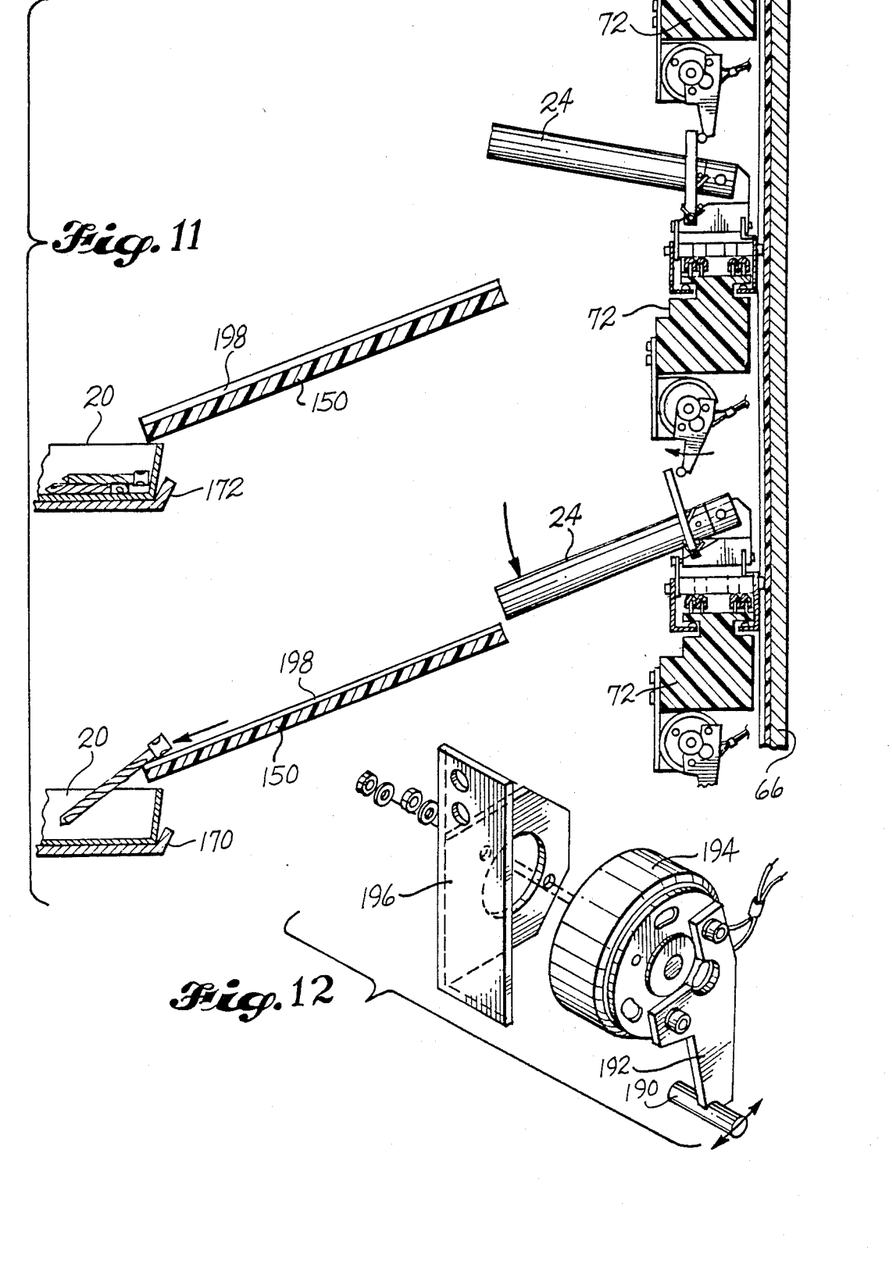
FIG. 11 is a fragmentary sectional view taken substantially along line 11—11 of FIG. 4, with some parts shown in side elevation.
FIG. 12 is an enlarged scale isometric view of an operator for operating a carrier tube release mechanism.

A helical track 70, that is preferably constructed in sections, is positioned around the rotation drum 66. As will be described, the track 70 is fixed in position and the flexible conveyor chain slides on it. The cross-sectional configuration of the track sections 72 is best shown by FIGS. 11 and 13. The track sections 72 have side grooves 74, 76, into which extend the lower portions of the conveyor plates 32, 34. These lower portions turn in towards each other and each preferably carries a button 78 constructed from a self-lubricating material. This is for the purpose of minimizing wear between the plates and the track sections. The buttons 78 make whatever contact occurs.

The track sections 72 include snap-on rail portions 80 constructed from a self-lubricating material on which the conveyor chain segments 44 ride. The track sections 72 curve about the drum 66 and define an ascending helical path along which the endless conveyor EC travels as it extends around the drum 66. When the endless conveyor EC reaches the upper end of the drum 66, it winds off from such drum 66 at a tangent and is then guided over a toothed wheel or sprocket 82. It then extends vertically downwardly from the wheel 82 to a lower curved block 84 (FIG. 4). It bends around curved block 84 and then extends as a lower run until it reaches an end wheel or sprocket 86 which is adjacent the article loading station. It extends upwardly and around the toothed wheel or sprocket 86 and then again becomes the aforementioned upper run which extends back to the drum 66 over infeed sprocket 107 (FIG. 5).

Figure 5:
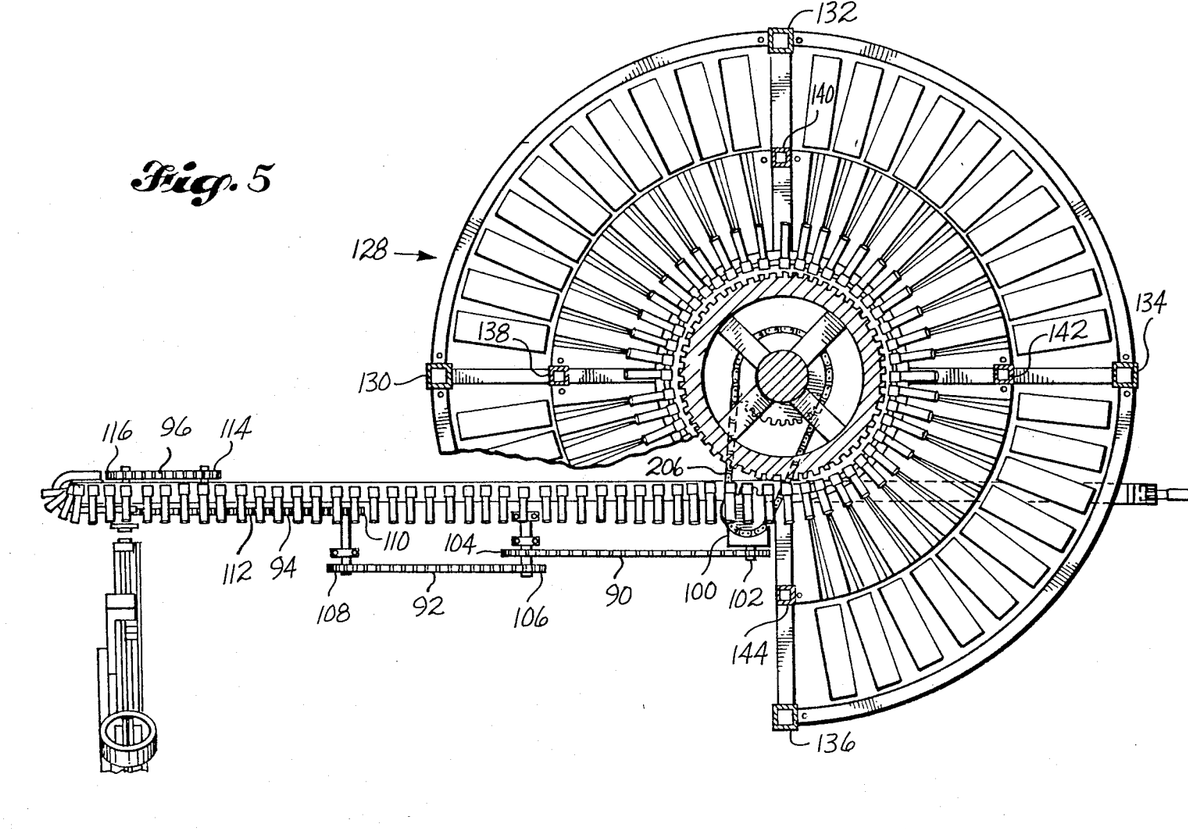
FIG. 5 is a top plan view of the mechanism shown by FIG. 4 with an upper portion removed for the purposes of better illustrating lower portions of the mechanism.
Figure 7:
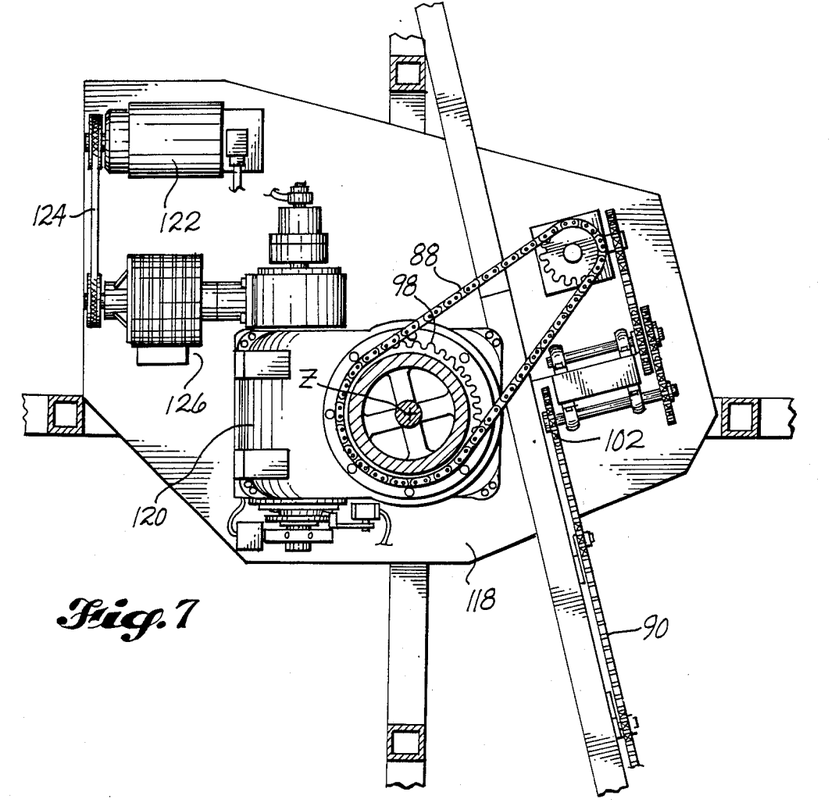
FIG. 7 is a cross-sectional view taken substantially along line 7—7 of FIG. 4.

A series of chains and sprockets extend between the drum 66 and the gear 86 (FIGS. 4, 5 and 7). In FIG. 5 the chains are designated 88, 90, 92, 94, 96. The sprockets are designated 98, 100, 102, 104, 106, 108, 110, 112, 114, 116. The purpose of this drive train is to coordinate rotation of the drum 66 with the positioning of the carrier tubes 24 at the loading station. The chain and sprocket drive train causes the filled carrier tubes 24 to be moved forwardly from the loading station a distance equal to the spacing between the tubes at the same time that the drum 66 moves forward one step equal to the spacing between the tubes 24. Each step of movement is also equal to the center-to-center spacing of the receptacles 20, projected along radial lines to the helical track, as will hereinafter be described in more detail.

Referring to FIG. 7, a base member 118 is illustrated. A step drive 120 is shown positioned on the base member 118. A drive motor 122 is connected by a belt and pulley drive 124 to an input clutch-brake 126 to the step drive 120. Many different mechanisms exist for providing a step drive. This type of mechanism is not per se a part of the present invention. Accordingly, the details of the step drive are not to be disclosed. It is only important that the output of the step drive 120 is connected to the lower end of the drum 66, and that it functions to move the drum 66 in step-by-step rotational increments. In the illustrated embodiment, each step is exactly six degrees of rotation of the drum 66. In some other installation it may be necessary or desirable to use either a longer or a shorter step length.

Figure 10:
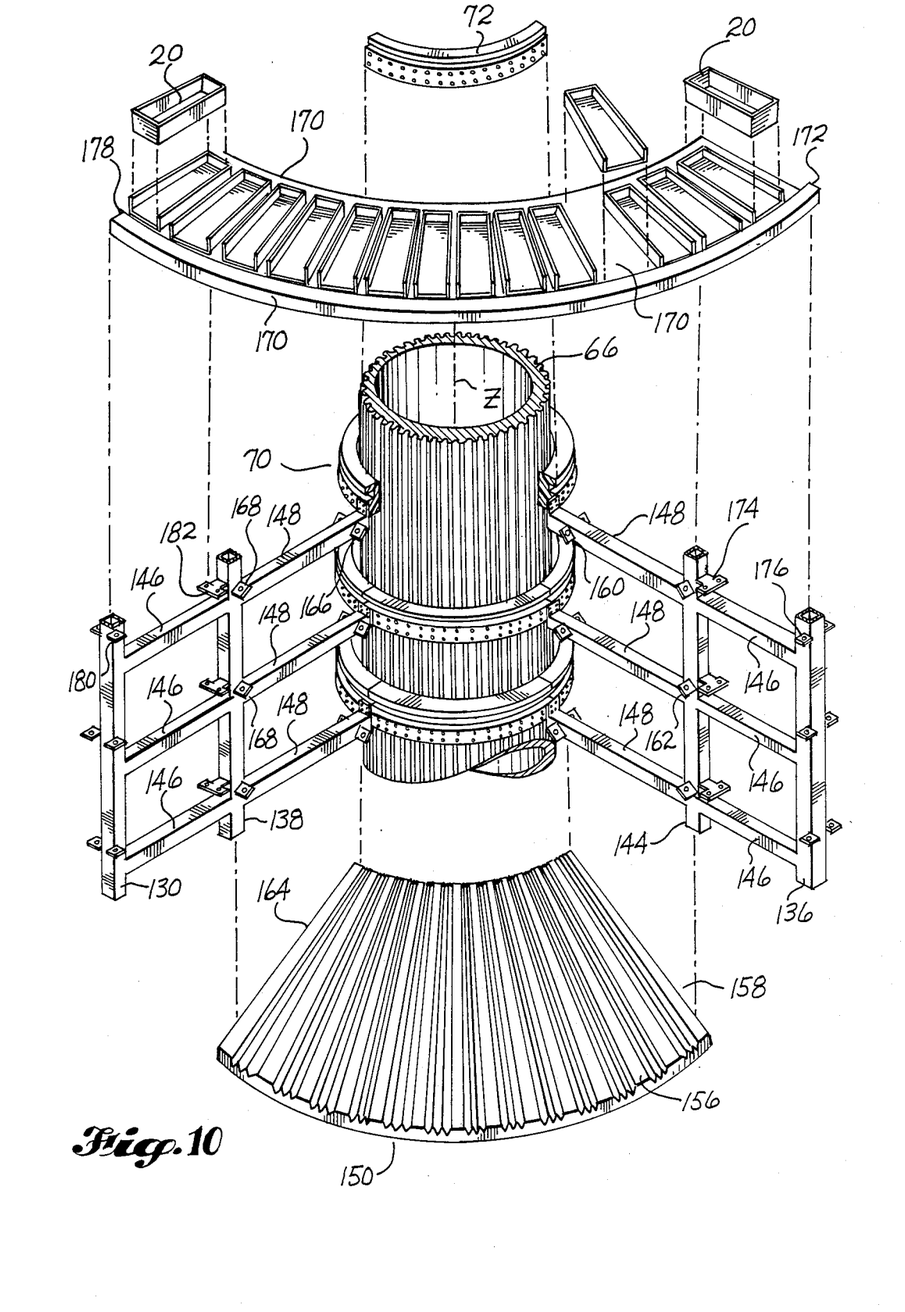
FIG. 10 is an exploded isometric view of a portion of the sorted article receiving and storing mechanism, with some parts shown in section and other parts omitted.

In preferred form, the article storage mechanism comprises a frame 128 composed of four outside columns 130, 132, 134, 136. Four additional columns 138, 140, 142, 144 are spaced radially inwardly from the columns 130, 132, 134, 136. A plurality of horizontal frame members 146 extend between and interconnect each radially associated pair of columns. For example, in FIG. 10, columns 130 and 138 are shown to be connected together by the members 146. Columns 136 and 144 are also shown to be connected together by these members 146. Additional horizontal frame members 148 project radially inwardly from the inside columns 138, 140, 142, 146, towards the drum 66. These frame members 148 are also shown in FIG. 10, extending inwardly from the columns 138 and 144. The members 148 are in effect cantilever beams. Their function will hereinafter be described.

As best shown by FIG. 10, but also shown to a considerable extent by FIGS. 4 and 5, each radially associated pair of columns, and their horizontal members 146, 148, together define a frame portion which is spaced circumferentially from like frame portions defined by the other column pairs and the frame members 146, 148 connected to them. In the illustrated embodiment, the frame 128 comprises four frame portions, positioned ninety degrees apart. By way of example, the frame portion defined by columns 130 and horizontal frame members 146, 148, is situated in a radial plane. The same is true of the other three frame portions.

As shown by FIG. 4, the sorted article receiving receptacles 20 are positioned on the frame 128 so as to wind around the drum 66 in a helical fashion. A helical ramp 150 is positioned radially between the helical pattern of receptacles 20 and the helical path of travel of the endless conveyor EC, established by the helical track. As best shown by FIG. 10, the helical track is constructed to be in sections 72. Each track section 72 is arcuate and has an angular length of ninety degrees. Each track section 72 is secured at its ends to the inner end portions of the cantilever beams 148.

In like fashion, the helical ramp 150 is constructed in ninety degree segments which are detachably connected at their ends to the above-described frame portions. As shown in FIG. 10, one end 158 of a ramp segment 156 may be attached, such as by the use of screw fasteners, to mounting ears 160, 162. The opposite end 164 may be attached by screw fasteners to mounting ears 166, 168.

The receptacles 20 are supported on arcuate support beams 170, the opposite ends of which are also detachably secured to the frame portions. For example, in FIG. 10, a first end 172 of beam segment 170 is secured, such as by use of screw fasteners, to mounting brackets 174 and 176. The opposite end 178 of the beam 170 may be attached by screw fasteners to mounting brackets 180 and 182. As should be apparent by an inspection of FIG. 10, the mechanism can be easily and quickly disassembled by first removing the receptacle support beams 170, and then the ramp segments 150, and then the track segments 72.

The upper and lower ends of the frame portions can be connected together in any suitable fashion. By way of example, the lower ends of the various columns 130, 132, 134, 136, 138, 140, 142, 144 can set down into sockets formed in the base structure. The upper ends of these columns may fit into a unitary cross frame structure provided at the upper end of the frame 128. This cross frame structure can carry, at its center, a bearing for supporting the upper end of the drive drum 66.

FIGS. 11 and 13 show that the drum 66 is immediately outwardly bounded by the helical track segments 72. The track segments 72 are fixed in position relative to the rotating drum 66, by the just described frame structure.

FIGS. 11 and 13 also show the relative positioning of the track segments 72 to the ramp segments 150 and the article receptacles 20.

FIGS. 11 and 13 further show that as the carrier tubes 24 are being guided along the helical track, their "up" position is established by an engagement between a limb member 184, extending outwardly from a position arm 186, and a pin 188 on the carrier tube 24. The positioning arms 186 are moved along a path which is laterally bounded by the lower ends 190 of tip arms 192. The upper ends of the tip arms 192 are attached to the output of a rotary solenoid 194 which is mounted by a mounting bracket 196 onto a portion of a track section 72. In use, when electric energy is delivered to a given solenoid 194, the solenoid 194 is energized and it functions to rotate its tip arm 192 towards any position arm 186 that may be in its path of travel. When a particular article 10 is identified, such as by use of an optical micrometer 18 as previously described, and is then loaded into a particular carrier tube 24, the identification information obtained with respect to the article, together with stored information in computer "B", tells the computer how many steps away the just-loaded carrier tube 24 is from the particular receptacle 20 that is to receive the particular article 10 that is in such tube 24. The computer "B" then keeps track of the number of steps of movement that the loaded carrier tube is away from the loading station. When such carrier tube 24 reaches a position that is in radial alignment with the particular receptacle corresponding to the article 10 which such tube is carrying, the computer "B" sends an electrical signal to the solenoid 194 that is associated with such receptacle 20. The energized solenoid 194 rotates its tip arm 192 against the arm 186, causing a disengagement of the pin 188 from the limb 184. This frees the tube 24 for pivotal movement and it pivots downwardly, in the manner shown in FIG. 13. When the tube 24 is in its down position, shown in broken lines in FIG. 13, the article 10 moves by gravity out from the tube 24, and into a guide groove 198 that extends radially along the upper surface of the ramp section 150, to the receptacle 20 (FIG. 11).

As shown by FIG. 13, the closed end of each tube 24 is pivotally attached to a base portion 200 of its carrier unit 26, by a pivot pin 202. The lower end of the position arm 186 is pivotally attached to the base 200 by means of a pivot pin 204. A torsion spring 206, at the lower end of arm 186, biases the arm 186 into a substantially upright position. The torsion spring 206 includes a loop which surrounds the pivot pin 204. One end of spring 206 is captured under a pin 208, carried by member 200. The opposite end of spring 206 is bent to lap partially around a lower portion of the arm 186, on the side of the arm 186 opposite the pin 208. Owing to this arrangement, the spring 206 biases the arm 186 towards the pin 188. This places the arm 186 into a substantially upright position.

A more detailed description of the construction and operation of the components of the carrier units 26, and the manner of loading articles 10 into the carrier tubes 24, is set forth in my aforementioned copending application Ser. No. 07/270,221, entitled "Article Sorting Apparatus And Method." A preferred positioning of the storage mechanism relative to other portions of a complete system for separating, singulating and identifying the articles 10, is set forth in my aforementioned copending application Ser. No. 07/270,130, entitled "Article Singulating System And Method." In such application the storage mechanism is shown to comprise an elevated walkway, located above the level of the upper run of the endless conveyor EC, and extending circumferentially around the entire mechanism. A stairway may be provided from floor level up to the walkway. Such a walkway may be desired and can be utilized with the storage mechanism.

It should be understood that the embodiment which has been illustrated, and which comprises the best mode at the time of filing, is presented for example purposes. The scope of coverage is not to be limited by the details of such disclosed example, but rather is to be established by the following claims, interpreted in accordance with established rules of patent claim interpretation, including use of the doctrine of equivalents.

What is claimed is:

1. An article storage mechanism, comprising:
   frame positioned about a vertical axis;
   a helical track supported on said frame, said helical track extending about said vertical axis and having a lower entrance end and an upper exit end;
   an endless conveyor comprising a series of article carriers connected together and movable along an endless path; said helical track defining a portion of said endless path; and
   a plurality of article receiving receptacles supported by said frame, radially outwardly from the helical track, each for receiving articles carried to it by said article carriers, wherein said plurality of article receiving receptacles is positioned in a helical pattern radially outwardly of the helical track.

2. A mechanism according to claim 1, wherein said frame includes a plurality of circumferentially spaced apart frame portions, each including a support column spaced radially outwardly from said axis, and support members projecting radially inwardly from the support columns towards said axis, said helical track being supported by and on said support members.

3. A mechanism according to claim 2, wherein said helical track is in sectional construction, and each section is connected to the support members of an adjacent pair of the frame portions.

4. A mechanism according to claim 2, comprising support beams for said receptacles which extend between and are supported by adjacent frame portions, with a plurality of receptacles being supported on each support beam.

5. A mechanism according to claim 4, further comprising a delivery ramp positioned radially between the helical track and the article receiving receptacles, said delivery ramp sloping downwardly as it extends radially outwardly from the helical track to the article receiving receptacles, said ramp being supported by and on said frame.

6. A mechanism according to claim 1, further comprising a delivery ramp extending radially outwardly and downwardly from the helical track to the receptacles.

7. A mechanism according to claim 1, further comprising a delivery ramp disposed radially between the helical track and the plurality of article receiving receptacles, said ramp sloping downwardly as it extends radially outwardly from the helical track, and said plurality of article receiving receptacles being positioned to extend substantially along the outer boundary of the delivery ramp.

8. A mechanism according to claim 7, wherein said ramp includes radially outwardly and downwardly sloping channels, each extending from the helical track to a separate one of the article receiving receptacles.

9. A mechanism according to claim 1, wherein said frame comprises a plurality of circumferentially spaced apart, radially extending frame portions, each including inner portions to which the helical track is connected.

10. A mechanism according to claim 9, wherein said helical track is constructed in segments and each segment extends between an adjacent pair of the frame portions.

11. A mechanism according to claim 9, comprising support beams for the receptacles extending between and connected to the frame portions.

12. A mechanism according to claim 11, wherein the support beams for the receptacles are removably connected at their ends to the frame portions.

13. A mechanism according to claim 9, further comprising a delivery ramp positioned radially between the helical track and the plurality of article receiving receptacles, and connected to said frame portions, said ramp sloping downwardly as it extends outwardly from the helical path to the plurality of receptacles.

14. A mechanism according to claim 13, wherein the delivery ramp is sectional and each section extends between an adjacent pair of the frame portions.

15. A mechanism according to claim 14, wherein the ramp sections are at their ends detachably connected to the frame portions.

16. A mechanism according to claim 14, comprising support beams for the receptacles which are innerconnected between the frame portions.

17. A mechanism according to claim 1, further comprising a step drive for the endless conveyor, for moving the endless conveyor in steps, with each step moving each article carrier from a position of radial alignment with one of the article reeeiving receptacles to a position of radial alignment with the next article receiving receptacle along the endless path.

18. A mechanism according to claim 17, wherein said frame includes a plurality of circumferentially spaced apart frame portions, each including a support column spaced radially outwardly from said axis, and support members projecting radially inwardly from the support columns towards said axis, said helical track being supported by and on said support members.

19. A mechanism according to claim 18, wherein said helical track is in sectional construction, and each section is connected to the support members of an adjacent pair of the frame portions.

20. A mechanism according to claim 18, comprising support beams for said receptacles which extend between and are supported by adjacent frame portions, with a plurality of receptacles being supported on each support beam.

21. A mechanism according to claim 20, further comprising a delivery ramp positioned radially between the helical track and the article receiving receptacles, said delivery ramp sloping downwardly as it extends radially outwardly from the helical track to the article receiving receptacles, said ramp being supported by and on said frame.

22. A mechanism according to claim 17, further comprising a delivery ramp extending radially outwardly and downwardly from the helical track to the receptacles.

23. A mechanism according to claim 17, further comprising a delivery ramp disposed radially between the helical track and the plurality of article receiving receptacles, said delivery ramp sloping downwardly as it extends radially outwardly from the helical track, and said plurality of article receiving receptacles being positioned to extend substantially along the outer boundary of the delivery ramp.

24. A mechanism according to claim 23, wherein said delivery ramp includes radially outwardly and downwardly sloping channels, each extending from the helical track to a separate one of the article receiving receptacles.

25. A mechanism according to claim 17, wherein said frame comprises a plurality of circumferentially spaced apart, radially extending frame portions, each including inner portions to which the helical track is connected.

26. A mechanism according to claim 25, wherein said helical track is constructed in segments and each segment extends between an adjacent pair of the frame portions.

27. A mechanism according to claim 25, comprising support beams for the receptacles extending between and connected to the frame portions.

28. A mechanism according to claim 27, wherein the support beams for the receptacles are removably connected at their ends to the frame portions.

29. A mechanism according to claim 25, further comprising a delivery ramp positioned radially between the helical track and the plurality of article receiving receptacles, and connected to said frame portions, said ramp sloping downwardly as it extends outwardly from the helical path to the plurality of receptacles.

30. A mechanism according to claim 29, wherein the delivery ramp is sectional and each section extends between an adjacent pair of the frame portions.

31. A mechanism according to claim 30, wherein the ramp sections are at their ends detachably connected to the frame portions.

32. A mechanism according to claim 1, further comprising an elongated drum extending vertically of the frame, and supported for rotation about said vertical axis, inwardly of said helical track, a rotary intermittent drive for said drum, connected to step the drum in position, and a drive transferring connection between the drum and the endless conveyor, with each step moving said article carrier from a position of radial alignment with an article receiving receptacle into a position of radial alignment with the next article receiving receptacle along the endless path.

33. A mechanism according to claim 32, wherein said frame includes a plurality of circumferentially spaced apart frame portions, each including a support column spaced radially outwardly from said axis, and support members projecting radially inwardly from the support columns towards said axis, said helical track being supported by and on said support members.

34. A mechanism according to claim 33, wherein said helical track is in sectional construction, and each section is connected to the support members of an adjacent pair of the frame portions.

35. A mechanism according to claim 33, comprising support beams for said receptacles which extend between and are supported by adjacent frame portions, with a plurality of receptacles being supported on each support beam.

36. A mechanism according to claim 35, further comprising a delivery ramp positioned radially between the helical track and the article receiving receptacles, said delivery ramp sloping downwardly as it extends radially outwardly from the helical track to the article receiving receptacles, said ramp being supported by and on said frame.

37. A mechanism according to claim 32, further comprising a delivery ramp extending radially outwardly and downwardly from the helical track to the receptacles.

38. A mechanism according to claim 32, further comprising a delivery ramp disposed radially between the helical track and the plurality of article receiving receptacles, said delivery ramp sloping downwardly as it extends radially outwardly from the helical track, and said plurality of article receiving receptacles being positioned to extend substantially along the outer boundary of the delivery ramp.

39. A mechanism according to claim 38, wherein said delivery ramp includes radially outwardly and downwardly sloping channels, each extending from the helical track to a separate one of the article receiving receptacles.

40. A mechanism according to claim 32, wherein said frame comprises a plurality of circumferentially spaced apart, radially extending frame portions, each including inner portions to which the helical track is connected.

41. A mechanism according to claim 40, wherein said helical track is constructed in segments and each segment extends between an adjacent pair of the frame portions.

42. A mechanism according to claim 40, comprising support beams for the receptacles extending between and connected to the frame portions.

43. A mechanism according to claim 42, wherein the support beams for the receptacles are removably connected at their ends to the frame portions.

44. A mechanism according to claim 40, further comprisinq a delivery ramp positioned radially between the helical track and the plurality of article receiving receptacles, and connected to said frame portions, said ramp sloping downwardly as it extends outwardly from the helical path to the plurality of receptacles.

45. A mechanism according to claim 44, wherein the delivery ramp is sectional and each section extends between an adjacent pair of the frame portions.

46. A mechanism according to claim 45, wherein the ramp sections are at their ends detachably connected to the frame portions.

47. A mechanism according to claim 45, comprising support beams for the receptacles which are innerconnected between the frame portions.

48. An article storage mechanism, comprising:
a frame positioned about a vertical axis;
a helical track supported on said frame, said helical track extending about said vertical axis and having a lower entrance end and an upper exit end;
an endless conveyor comprising a series of article carriers connected together and movable along an endless path; said helical track defining a portion of said endless path; and
a plurality of article receiving receptacles supported by said frame, radially outwardly from the helical track, each for receiving articles carried to it by said article carriers;
wherein each article carrier includes a base, a carrier tube having a closed end pivotally attached to the base and an open opposite end, and a tube support mounted on the base for movement between a support position and a release position, and when in its support position supporting the carrier tube with its open end directed upwardly a sufficient amount that an article in the tube will not fall by gravity out from the tube, and when in its release position allowing the carrier tube to pivot downwardly in position a sufficient amount to allow an article within the carrier tube to fall by gravity out from the carrier tube.

49. A mechanism according to claim 48, further including a separate operator associated with each article receiving receptacle and which can be energized on command to move the support member from its support position to its release position, to in that manner cause the support tube to swing in position and deposit any article in it into the associated receptacle.

50. A mechanism according to claim 49, further comprising a delivery ramp positioned radially between the helical track and the article receiving receptacles, said delivery ramp sloping downwardly as it extends radially outwardly from the helical track to the article receiving receptacles, said ramp being supported by and on said frame.

51. A mechanism according to claim 48, further comprising a delivery ramp extending radially outwardly and downwardly from the helical track to the receptacles.

52. A mechanism according to claim 48, wherein said plurality of article receiving receptacles is positioned in a helical pattern spaced radially outwardly of the helical track.

53. A mechanism according to claim 52, further comprising a delivery ramp disposed radially between the helical track and the plurality of article receiving receptacles, said delivery ramp sloping downwardly as it extends radially outwardly from the helical track, and said plurality of article receiving receptacles being positioned to extend substantially along the outer boundary of the delivery ramp.

54. A mechanism according to claim 53, wherein said delivery ramp includes radially outwardly and downwardly sloping channels, each extending from the helical track to a separate one of the article receiving receptacles.

55. A mechanism according to claim 49, wherein the operators are mounted on lower portions of the helical track, each in a position to be radially inwardly adjacent the path of travel of the tube supports on the article carriers, and each including an extendible portion which, when the operator is energized, extends radially against any tube support in its path, to move such tube support from its support position to its release position.

56. A mechanism according to claim 55, wherein the operator is an electric solenoid.

57. A mechanism according to claim 1, further comprising an elongated drum extending vertically of the frame, and supported for rotation about said vertical axis, inwardly of said helical track, a rotary intermittent drive for said drum, connected to step the drum in position, and a drive transferring connection between said drum and the endless conveyor, with each step of said drum moving each said article carrier from a position of radial alignment with an article receiving receptacle into a position of radial alignment with the next article receiving receptacle along the endless path, wherein said endless path of travel for the endless conveyor also includes an article loading station, a path section extending from the exit end of the helical track to the article loading station, a path section extending from the article loading station to the entrance end of the helical track, and a wheel adjacent the article loading station about which the endless conveyor extends, said mechanism further including a positive drive transmission interconnected between the drum and said wheel, so that each step movement of the drum is transmitted to the wheel, to cause a step movement of the wheel, and a drive transferring connection between the wheel and the endless conveyor.

58. A mechanism according to claim 30, comprising support beams for the receptacles which are interconnected between the frame portions.

* * * * *